United States Patent
Seck et al.

(10) Patent No.: US 11,958,335 B2
(45) Date of Patent: Apr. 16, 2024

(54) ELECTRIC ACTUATOR FOR A MOTOR VEHICLE HEATING, VENTILATION AND/OR AIR CONDITIONING SYSTEM

(71) Applicant: Valeo Systemes Thermiques, Le Mesnil-Saint-Denis (FR)

(72) Inventors: Rawane Seck, Le Mesnil Saint Denis (FR); Laurent Tellier, Le Mesnil Saint Denis (FR); Didier Barat, Le Mesnil Saint Denis (FR); Sébastien Colinet, Le Mesnil Saint-Denis (FR); Dione Gomis, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 911 days.

(21) Appl. No.: 16/970,783

(22) PCT Filed: Feb. 11, 2019

(86) PCT No.: PCT/FR2019/050288
§ 371 (c)(1),
(2) Date: Aug. 18, 2020

(87) PCT Pub. No.: WO2019/158841
PCT Pub. Date: Aug. 22, 2019

(65) Prior Publication Data
US 2020/0376923 A1  Dec. 3, 2020

(30) Foreign Application Priority Data
Feb. 19, 2018 (FR) ...................................... 1851379

(51) Int. Cl.
*H02K 7/116* (2006.01)
*B60H 1/00* (2006.01)
*H02K 11/33* (2016.01)

(52) U.S. Cl.
CPC ..... *B60H 1/00428* (2013.01); *B60H 1/00007* (2013.01); *H02K 7/116* (2013.01); *H02K 11/33* (2016.01); *H02K 2211/03* (2013.01)

(58) Field of Classification Search
CPC ........ H02K 11/33; H02K 11/30; H02K 7/116; H02K 7/10; H02K 7/003; H02K 2211/03; B60H 1/00428; B60H 1/00007
(Continued)

(56) References Cited

U.S. PATENT DOCUMENTS

2003/0222532 A1* 12/2003 Hsu ....................... F16H 57/033
310/68 R
2014/0319948 A1* 10/2014 Nagase .................. H02K 11/25
310/83
(Continued)

FOREIGN PATENT DOCUMENTS

DE  202006014817 U1    12/2006
DE  202006014817 U1 *  1/2007  ........... B60N 2/0232
(Continued)

OTHER PUBLICATIONS

Machine translation of DE-202006014817-U1. (Year: 2007).*
(Continued)

*Primary Examiner* — Michael Andrews
(74) *Attorney, Agent, or Firm* — Osha Bergman Watanabe & Burton LLP (57) ABSTRACT

The present invention relates to an electric actuator (1) suitable for driving a movable element for a heating, ventilation and/or air conditioning system for a motor vehicle, comprising:
an electric motor (10) comprising a stator (100) and a rotor (101);
a satellite ring gear (12) comprising at least one satellite (120);
(Continued)

an output wheel (13) suitable for being rotated by said satellite ring gear (12);

wherein:

said electric actuator (1) further comprises a drive wheel (11), directly connected to said rotor (101), suitable for being rotated by said rotor (101) and suitable for rotating said satellite ring gear (12);

said output wheel (13) comprises an output star wheel (130) suitable for driving said movable element (20) of said ventilation, heating and/or air conditioning system.

9 Claims, 7 Drawing Sheets

(58) Field of Classification Search
USPC .......................................................... 310/83
See application file for complete search history.

(56) References Cited

U.S. PATENT DOCUMENTS

| 2017/0254389 A1* | 9/2017 | Lau ...................... F16H 57/027 |
| 2019/0097495 A1* | 3/2019 | Dion ...................... H02K 37/24 |

FOREIGN PATENT DOCUMENTS

| DE | 102012212143 A1 | 10/2013 |
| EP | 1296440 A2 | 3/2003 |
| JP | 2013-230075 A | 11/2013 |
| WO | 2010115702 A1 | 10/2010 |

OTHER PUBLICATIONS

International Search Report and Written Opinion in corresponding International Application No. PCT/FR2019/050288, dated Apr. 17, 2019 (14 pages).

Notification of Reason for Rejection in corresponding Japanese Application No. 2020-543893, dated Dec. 24, 2021 (6 pages).

* cited by examiner

ELECTRIC ACTUATOR FOR A MOTOR VEHICLE HEATING, VENTILATION AND/OR AIR CONDITIONING SYSTEM

The present invention relates to an electric actuator suitable for driving a movable element for a heating, ventilation and/or air conditioning system for a motor vehicle.

Its particular, but non-limiting, application is in the heating, ventilation and/or air conditioning systems for a motor vehicle.

An electric actuator suitable for driving a movable element for a heating, ventilation and/or air conditioning system for a motor vehicle, which is known to a person skilled in the art, comprises:
- an electric motor comprising a stator and a rotor;
- a satellite ring gear comprising at least one satellite;
- an output wheel suitable for being rotated by said satellite ring gear;
- a drive shaft connected to the electric motor and suitable for rotating said satellite ring gear.

A disadvantage of this prior art is that the drive shaft needs to be correctly aligned perpendicular to the plane of the electric motor, of the satellite ring gear and of the output wheel to allow proper operation of the electric actuator, in particular in order to ensure a good connection between the drive shaft and the satellite ring gear and thus have good electric actuator efficiency. It can be difficult to obtain the alignment or it can alter over time due to the bearings of the drive shaft. The drive shaft then can have a precession movement, which can weaken the connections with the satellite ring gear and thus reduce the output torque at the output wheel.

In this context, the aim of the present invention is to propose an alternative solution to the aforementioned prior art.

To this end, the invention proposes an electric actuator suitable for driving a movable element for a heating, ventilation and/or air conditioning system for a motor vehicle, comprising:
- an electric motor comprising a stator and a rotor;
- a satellite ring gear comprising at least one satellite connected to said output wheel;
- an output wheel suitable for being rotated by said satellite ring gear;

wherein:
- said electric actuator further comprises a drive wheel, directly connected to said rotor, suitable for being rotated by said rotor and suitable for rotating said satellite ring gear;
- said output wheel comprises an output star wheel suitable for driving said movable element of said ventilation, heating and/or air conditioning system.

Thus, as will be seen in detail hereafter, replacing the drive shaft with a drive wheel directly connected to said rotor will, on the one hand, dispense with the problem of alignment and, on the other hand, will increase the compactness of the electric actuator. Furthermore, the problem of premature wear of the satellite ring gear due to the precession movement no longer exists.

According to non-limiting embodiments, the electric actuator can further comprise one or more additional features from among the following features:

According to a non-limiting embodiment, said drive wheel is overmolded with said rotor of said electric motor. This allows the number of parts in the electric actuator to be assembled to be reduced.

According to a non-limiting embodiment, said electric motor is fully or partly passed through by said output star wheel of said output wheel. This allows the electric actuator to be mounted on the heating, ventilation and/or air conditioning system in any direction.

According to a non-limiting embodiment, said rotor of said electric motor and said drive wheel are hollow. This allows the output star wheel to pass through said electric motor.

According to a non-limiting embodiment, said electric motor, said drive wheel, said satellite ring gear, and said output wheel extend along the same motor axis of said electric motor. This allows the bulk of said electric actuator to be reduced. Said drive wheel, said satellite ring gear, and said output wheel thus rotate about the motor axis of said electric motor.

According to a non-limiting embodiment, said electric actuator further comprises a housing, and said electric motor, said drive wheel, said satellite ring gear, and said output wheel are housed in said housing. This allows an electric motor casing to be dispensed with that is commonly used to only house the electric motor.

According to a non-limiting embodiment, said at least one satellite comprises two gear stages with different diameters. This allows the torque to be increased and the rotation speed to be decreased.

According to a non-limiting embodiment, said satellite ring gear comprises an odd number of satellites. This allows the satellite ring gear to be balanced and the output of the electric actuator to be improved.

According to a non-limiting embodiment, said drive wheel, said satellite ring gear, and said output wheel form a planetary gear train. This allows sufficient torque to be available for the electric actuator in a much reduced space.

According to a non-limiting embodiment, said electric actuator further comprises an electronic board positioned on or below said electric motor. This allows the lateral bulk of said electric actuator to be reduced and the electronic board is quick and easy to assemble.

According to a non-limiting embodiment, said electronic board is suitable for extending along a plane perpendicular to the motor axis of said electric motor. This allows the compactness of the electric actuator to be increased.

According to a non-limiting embodiment, the electronic board is positioned on the stator.

According to a non-limiting embodiment, said electronic board is suitable for surrounding all or part of said rotor and said drive wheel. Thus, the opening in the rotor is not hindered by the electronic board. The output star wheel of the output wheel can easily pass through said opening.

According to a non-limiting embodiment, the drive wheel is directly connected to at least one satellite of said satellite ring gear.

The drive wheel comprises teeth, which engage with the teeth of said at least one satellite of said satellite ring gear. This allows said satellite ring gear to be directly driven by said drive wheel. In particular, the teeth of the drive wheel are suitable for engaging with a first gear stage of said at least one satellite.

According to a non-limiting embodiment, said at least one satellite of the satellite ring gear is directly connected to said output wheel.

In particular, it comprises teeth that engage with the teeth of said output wheel. This allows the output wheel to be directly driven by said at least one satellite. In particular, the teeth of the output wheel are suitable for engaging with a second gear stage of said at least one satellite.

According to a non-limiting embodiment, the output star wheel is directly connected to the movable element of said heating, ventilation and/or air conditioning system.

In particular, it comprises teeth that engage with the teeth of the movable element of said heating, ventilation and/or air conditioning system. This allows said movable element to be directly driven by said output wheel, without an additional kinematic part.

According to a non-limiting embodiment, the shape of the output star wheel matches part of the movable element.

A heating, ventilation and/or air conditioning system is also proposed comprising an electric actuator according to any one of the aforementioned features.

The invention and its various applications will be better understood upon reading the following description and with reference to the accompanying figures, in which.

Elements that are identical, in structure or in function, and that appear in various figures use the same reference signs, unless otherwise specified.

The electric actuator 1 is described with reference to FIGS. 1 to 10b according to non-limiting embodiments.

The electric actuator 1 is adapted for driving a movable element 20 (schematically illustrated in FIG. 1) of a heating, ventilation and/or air conditioning system (not illustrated), commonly called HVAC "Heating Ventilation and Air Conditioning" system, for a motor vehicle.

Throughout the remainder of the description, the heating, ventilation and/or air conditioning system is also called HVAC system.

A motor vehicle is understood to be any type of motorized vehicle.

The electric actuator 1 is suitable for being mounted in the HVAC system. In a non-limiting embodiment, the electric actuator 1 is suitable for being mounted on a side of a wall of the HVAC system, whereas the movable element 20 is mounted on the other side.

In a non-limiting embodiment, the HVAC system is positioned below the dashboard of the motor vehicle.

An HVAC system thermally manages a passenger compartment of the motor vehicle. It allows an air flow directed into the passenger compartment to be moved and thermally conditioned, in particular with a view to heating and/or cooling said passenger compartment.

To this end, the HVAC system comprises a heat exchanger, in particular a radiator, allowing a heating function to be provided and a heat exchanger, in particular an evaporator, allowing a cooling function to be provided. The air flow circulating in the HVAC system is channelled toward one and/or the other of the heat exchangers in order to implement the desired thermal conditioning. The HVAC system delivers the thermally treated air flow at particular zones of the passenger compartment, such as a lower zone of the passenger compartment, called "base", a zone of the windshield and/or an upper zone of the passenger compartment, called "ventilation" zone, particularly located in the vicinity of the face of the passenger of the vehicle.

The circulation of the air flow through heat exchangers and the selective distribution of the treated air flow toward the aforementioned various zones of the passenger compartment occurs through the activation of movable elements 20, disposed through distribution ducts provided in the HVAC system. A movable element 20 is electrically controlled individually by an electric actuator 1 or several movable elements 20 are electrically controlled by an electric actuator 1. The electric setpoint that they receive from the electric actuator 1 is converted into a movement of the movable elements 20 in order to move them to a certain position. The electric actuator 1 thus allows one or more movable elements 20 to be automatically controlled.

In a non-limiting embodiment, these movable elements 20 are air flaps. This non-limiting embodiment is used throughout the remainder of the description.

Figure 1:
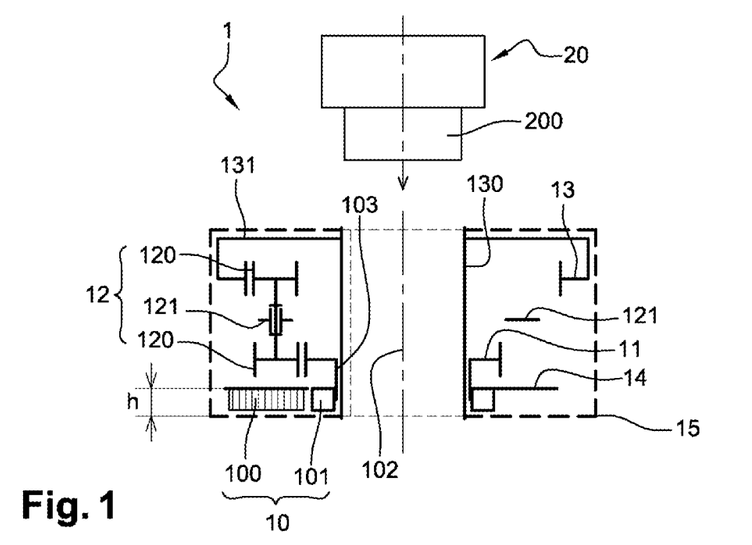
FIG. 1 shows a kinematic block diagram of an electric actuator for a heating, ventilation and/or air conditioning system for a motor vehicle, said electric actuator comprising a housing, an electric motor, a drive wheel, an electronic board, a satellite ring gear, and an output wheel, according to a non-limiting embodiment.
Figure 2:
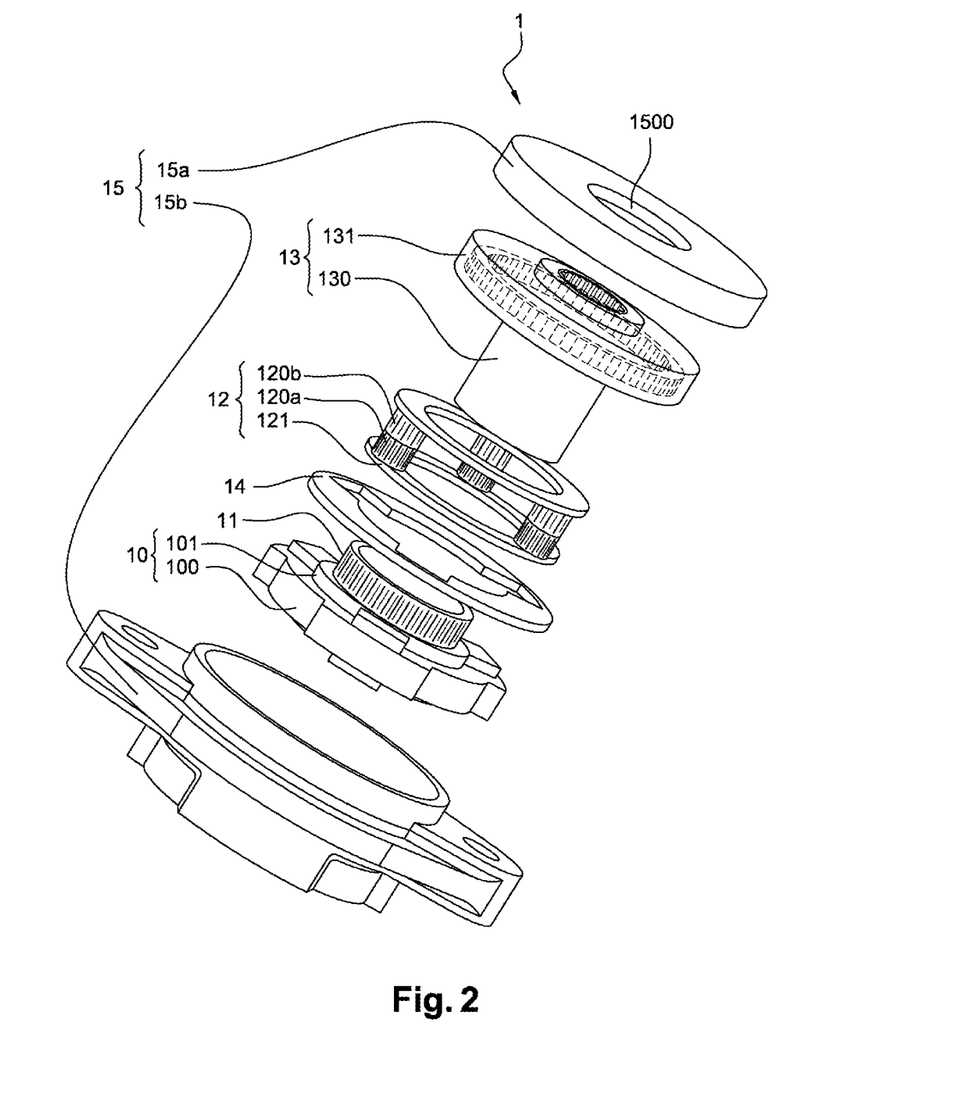
FIG. 2 shows an exploded view of the electric actuator of FIG. 1, according to a non-limiting embodiment.

As illustrated in FIGS. 1 and 2, the electric actuator 1 comprises:
- an electric motor 10 comprising a stator 100 and a rotor 101;
- a drive wheel 11;
- a satellite ring gear 12 comprising at least one satellite 120;
- an output wheel 13.

The drive wheel 11, the satellite ring gear 12 and the output wheel 13 form a gear train, which is a reduction gear.

In a non-limiting embodiment, the electric actuator 1 further comprises an electronic board 14.

In a non-limiting embodiment, the electric actuator 1 further comprises a housing 15.

In a non-limiting embodiment, the electric actuator 1 has a substantially circular shape.

Figure 3:
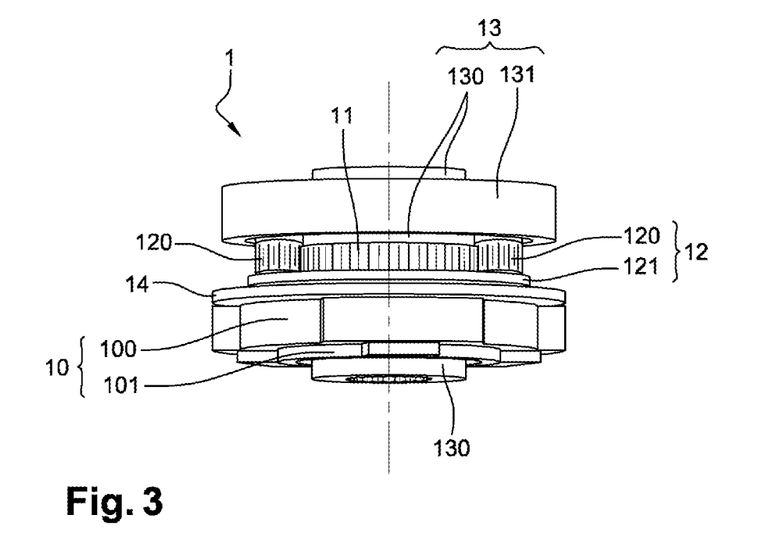
FIG. 3 shows a profile view of the electric actuator of FIGS. 1 and 2 without the housing, according to a non-limiting embodiment.

As illustrated in FIGS. 1 to 3, the electric motor 10, the drive wheel 11, the satellite ring gear 12, and the output wheel 13 are coaxial. Thus, they extend along the same axis, which is the motor axis 102 of said electric motor 10. This allows lateral compactness to be increased.

As illustrated in FIG. 1, it is to be noted that the axis of the movable element 20 also coincides with the motor axis 102. In a non-limiting embodiment, the electric actuator 1 is suitable for detecting that the movable element 20, such as the air flap, has reached the travel limit.

There is a physical stop at the travel limit. The electric actuator 1 is capable of detecting the travel limit. It thus comprises a stop detection function. This allows the control of the electric motor 10 to be shut off so that there is no noise as a result of the movable element 20 that reaches the stop and so that there is no wear in the teeth of the various wheels 11, 12, 13 of the electric actuator 1. At this point, the electric actuator 1 is called smart electric actuator. With the stop detection function and its implementation being known to a person skilled in the art, it is not described in further detail herein.

The various elements of the electric actuator 1 are described in detail hereafter.

Housing 15

The housing 15 is illustrated in FIGS. 1, 2, 10a and 10b.

It allows the electric actuator 1 to be mounted in the HVAC system.

In a non-limiting embodiment, the housing 15 is made of a plastic material. This allows a housing 15 to be provided that is lighter, cheaper and quieter than if it was made of a metal material.

The housing 15 is suitable for accommodating the electric motor 10, the drive wheel 11, the satellite ring gear 12 and the output wheel 13. Thus, the electric motor 10, the drive wheel 11, the satellite ring gear 12 and the output wheel 13 are housed in a single housing 15.

In an illustrated non-limiting embodiment, the housing 15 has a substantially circular shape.

Figure 10A:
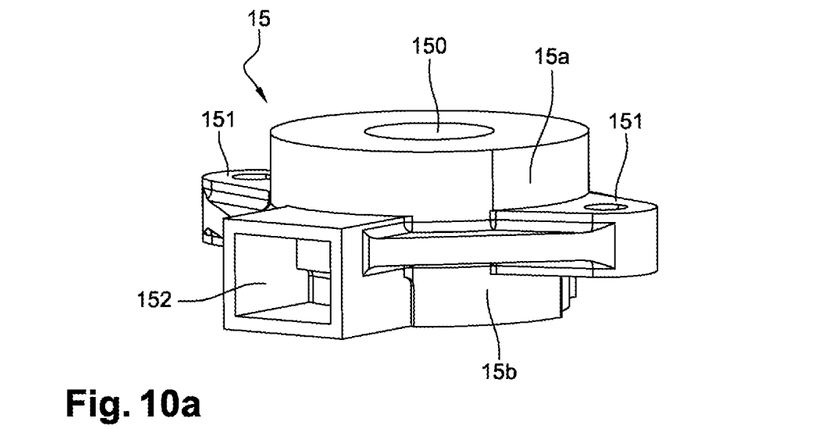
FIG. 10a shows a perspective view of the housing of the electric actuator of FIGS. 1 and 2, according to a non-limiting embodiment.

As illustrated in FIG. 10a, the housing 15 comprises an upper cap 15a and a lower cap 15b suitable for covering and protecting the other elements 10, 11, 12, 13, 14 of the electric actuator 1.

In non-limiting examples, the upper cap 15a and the lower cap 15b are assembled together by clips or by bonding.

The upper cap 15a and the lower cap 15b substantially extend in a plane perpendicular to the motor axis 102.

Figure 10B:
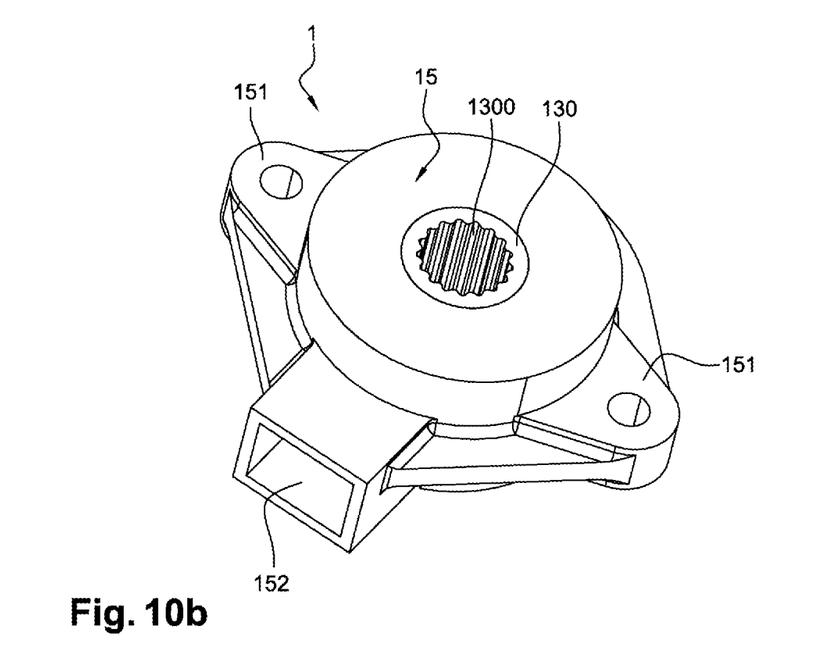
FIG. 10b shows a perspective view of the housing of FIG. 10a, in which housing the electric motor, the drive wheel, the satellite ring gear and the output wheel of the electric actuator of FIGS. 1 to 4 are housed, according to a non-limiting embodiment.

In a non-limiting embodiment, the housing 15 further comprises an opening 150, illustrated in FIG. 10a, provided in the upper cap 15a, into which opening an end of an output star wheel 130 of the output wheel 13 (described hereafter) can be inserted, as illustrated in FIG. 10b. This opening 150 allows the output wheel 13 to be retained in position.

In a non-limiting embodiment, the housing 15 further comprises a device 151 for mounting onto the HVAC system. In a non-limiting embodiment, the mounting device 151 radially projects from the upper cap 15a or the lower cap 15b or on both sides of the two lids.

In the illustrated non-limiting example, the mounting device is formed by two lugs 151 passed through by orifices suitable for receiving a screw each. The two lugs 151 radially project from the upper cap 15a and from the lower cap 15b, as illustrated in FIG. 10a.

It will be noted that having the mounting device 151 on both sides of the upper cap 15a and of the lower cap 15b allows the screws that engage with the mounting device 151 to retain the upper cap 15a and the lower cap 15b so as to prevent them from separating from each other when a pressure force is applied onto the upper cap 15a. Such a pressure force is applied when the movable element 20 is mounted on the output wheel 13.

In a non-limiting embodiment, the housing 15 further comprises an electric plug 152. The electric plug 152 emerges from the housing 15 and extends radially. It forms an electric interface between the electronic board 14 described hereafter and an electric connector (not illustrated), which transmits control signals and power signals for respectively controlling and powering said electronic board 14. These control signals and power signals are generated by an electronic control unit (not illustrated) of the motor vehicle.

Electric Motor 10

The electric motor 10 is fully or partly illustrated in FIGS. 1 to 9b.

In non-limiting embodiments, the electric motor 10 is a bipolar stepper motor or a three-phase motor, or a brushed or brushless direct current motor.

It is housed in the housing 15.

The electric motor 10 comprises a motor axis 102, illustrated in FIGS. 1 and 3.

Figure 5:
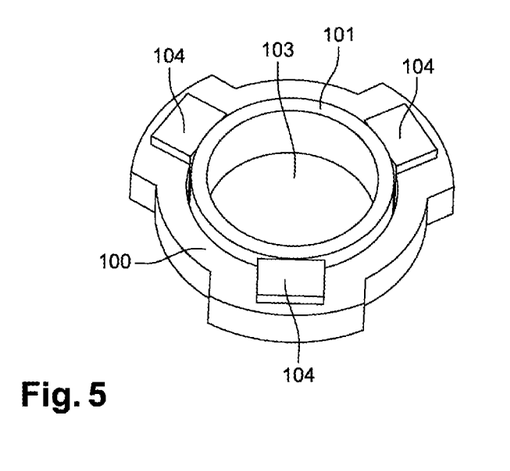
FIG. 5 shows a perspective view of the stator and of the rotor of the electric motor of the electric actuator of FIGS. 1 to 4, according to a non-limiting embodiment.

As illustrated in FIG. 5, in a non-limiting embodiment, the rotor 101 is an internal rotor, namely it is located inside the stator 100. Thus, it is nested within the stator 100.

The stator 100 assumes a hollow annular shape and comprises a series of copper coils 104 surrounding the rotor 101. There are three coils 104 in the illustrated example. In other non-limiting examples, not illustrated, there are six or eight coils 104.

The electric motor 10 is suitable for rotating the drive wheel 11, thus causing the satellite ring gear 12 and the output wheel 13 to rotate, and consequently causing the movable element 20 to move.

More specifically, the rotor 101 of the electric motor 10 is suitable for rotating the drive wheel 11.

Figure 6A:
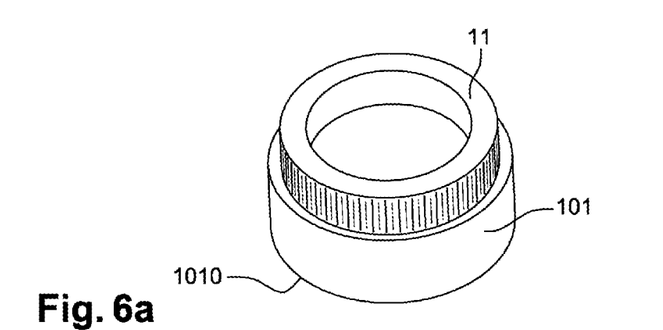
FIG. 6a shows a perspective view of the rotor of the electric motor assembled on the drive wheel of the electric actuator of FIGS. 1 to 4, according to a non-limiting embodiment.

In a non-limiting embodiment illustrated in FIG. 6a, for example, the rotor 101 and the drive wheel 11 are rigidly connected together. The rotor 101 is thus directly connected to the drive wheel 11. This allows the rotor 101 to form part of the gear train formed by the drive wheel 11, the satellite ring gear 12, and said output wheel 13.

In a non-limiting alternative embodiment, the rotor 101 and the drive wheel 11 are nested together. In another non-limiting embodiment, the drive wheel 11 is overmolded with the rotor 101. This allows simpler and quicker assembly of the electric actuator 1, since there are less parts to assemble.

In an illustrated non-limiting embodiment, the diameter of the rotor 101 is greater than that of the drive wheel 11.

In a non-limiting embodiment, not illustrated, the part of the drive wheel 11 nested within the rotor 101 comprises a diameter that is smaller than that of the rotor 101 and the other part connected to the satellite ring gear 12 comprises a diameter that is greater than that of the rotor 101.

In a non-limiting embodiment, illustrated in FIG. 5, for example, the rotor 101 is a hollow cylinder. Such a rotor 101 allows an electric motor 10 to be obtained that is lighter than an electric motor 10 that comprises a solid rotor. Indeed, in this latter case, at equal torque, the magnetic flux in the stator needs to be increased and to this end a stator with larger coils, or a larger stator that is thus heavier, is required. In a non-limiting embodiment, the output star wheel 130 fully or partly passes through the electric motor 10. Thus, said electric motor is fully or partly passed through by said output star wheel of said output wheel.

In particular, the rotor 101, which is a hollow cylinder, is fully or partly passed through by the output star wheel 130 of said output wheel 13. Thus, the rotor 101 comprises an opening 103, through which the output star wheel 130 of said output wheel 13 (described hereafter) can fully or partly pass.

Thus, the rotor 101 comprises a wide base 1010 so as to allow through the output star wheel 130. Widening the base 1010 of the rotor 101 allows the height of the electric motor 10 to be reduced. An electric motor 10 is thus obtained that is relatively flat and more powerful.

Furthermore, this allows a greater magnetic field to be obtained and therefore allows more torque to be obtained than for a smaller rotor.

With the drive wheel 11 being rigidly connected to the rotor 101, the output star wheel 130 thus also fully or partly passes through the drive wheel 11. The drive wheel 11 thus also comprises said opening 103.

Drive Wheel 11

The drive wheel 11 is illustrated in FIGS. 1 to 4 and 6a to 9b.

The drive wheel is also called internal planet gear.

As previously described, in a non-limiting embodiment, the drive wheel 11 is rigidly connected to the rotor 101. In a non-limiting alternative embodiment, it is overmolded with the rotor 101 of the electric motor 10.

Figure 6B:
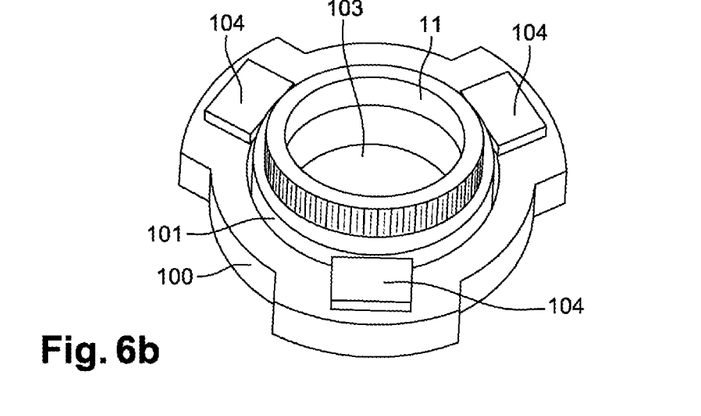
FIG. 6b shows a perspective view of the rotor-drive wheel assembly of FIG. 6a assembled with the stator of the electric motor of FIG. 5, according to a non-limiting embodiment.

As illustrated in FIG. 6b, the rotor-drive wheel assembly is nested within the stator 100.

With the drive wheel being rigidly connected to the rotor 101, no precession movement can be generated. Furthermore, there are no longer any bearings, nor drive shaft to be retained in an axis. Mounting is thus simpler. The number of parts is thus reduced.

The drive wheel 11 is suitable for:
  being rotated by the rotor 101 of the electric motor 10, as previously described; and
  being rotated by the satellite ring gear 12.

The drive wheel 11 rotates about the motor axis 102.

The drive wheel 11 is nested within the satellite ring gear 120 described hereafter, in particular in the support 121 thereof.

The drive wheel 11 engages with at least one satellite 120 of the satellite ring gear 12. In the example illustrated in the figures, it engages with three satellites 120.

In a non-limiting embodiment, when a satellite 120 comprises two gear stages 120a, 120b with different diameters, the drive wheel 11 engages with a single gear stage 120a of a satellite 120. Said gear stage 120a is the stage closest to the electric motor 10.

The drive wheel 11 is directly connected to the satellite 120, in this case particularly with its gear stage 120a.

In a non-limiting embodiment, the drive wheel 11 comprises a toothed external surface, the teeth of which engage with the teeth of the satellite 120 (in particular of the gear stage 120a) so that it can be rotated.

In order to adjust the value of the output torque and of the speed, the number of teeth of the drive wheel 11 and the gear assembly are adjusted.

By virtue of the planetary gear train (described hereafter), the output torque is increased in order to move the movable element 20. Therefore, having a high-powered electric motor 10 is not necessary. Thus, the energy for rotating the electric motor is saved. In a non-limiting example, the power of the electric motor 10 is at least 0.2 N/cm. Thus, the lower the power of the electric motor 10, the higher the output torque, by adjusting the gear ratio, for example, the planetary gear train.

Satellite Ring Gear 12

The satellite ring gear 12 is illustrated in FIGS. 1 to 4 and 8a to 9b.

The satellite ring gear 12 comprises:
  at least one satellite 120;
  a support 121, also called satellite carrier.

A satellite 120 is also called planet gear.

The satellite ring gear 12 is suitable for:
  being rotated by the drive wheel 11, as previously described;
  rotating the output wheel 13.

A satellite 120 is suitable for rotating about itself. It completes one rotation about its axis. Furthermore, it is suitable for rotating about the motor axis 102.

In a non-limiting embodiment, a satellite 120 is formed by at least one toothed wheel, also called gear, the teeth of which engage with the teeth formed on the output wheel 13 described hereafter, so that it can be rotated.

In a non-limiting embodiment, the satellite ring gear 12 is a dual stage gear.

Thus, a satellite 120 comprises two gear stages 120a, 120b.

In a non-limiting embodiment, a satellite 120 comprises two gear stages 120a, 120b with different diameters and a different number of teeth. In a non-limiting embodiment, a satellite 120 is a one-piece part.

The diameter of the gear stage 120b, also called upper gear stage 120b, is greater than the gear stage 120a, otherwise called lower gear stage 120a.

This allows the torque to be increased and the speed to be decreased.

In particular, the lower gear stage 120a is suitable for engaging with the drive wheel 11, as previously described. It is directly connected to the drive wheel 11.

The upper gear stage 120b is suitable for engaging with the output wheel 13 so that it can be rotated. It is directly connected to said output wheel 13. In particular, it is in contact with the teeth of an external planet gear 131 of the output wheel 13 (described hereafter).

In a non-limiting embodiment, the satellite ring gear 12 comprises a plurality of satellites 120. This allows the efficiency of the gear train formed by the drive wheel 11, the satellite ring gear 12, and said output wheel 13 to be improved, since there are fewer slippages between the teeth that engage together; in other words, fewer teeth jump.

In a non-limiting embodiment, it comprises an odd number of satellites 120. In the illustrated non-limiting example, it comprises three satellites 120. This allows the satellite ring gear 12 to be balanced. Having three satellites 120 is a good compromise between efficiency and bulk.

Figure 8A:
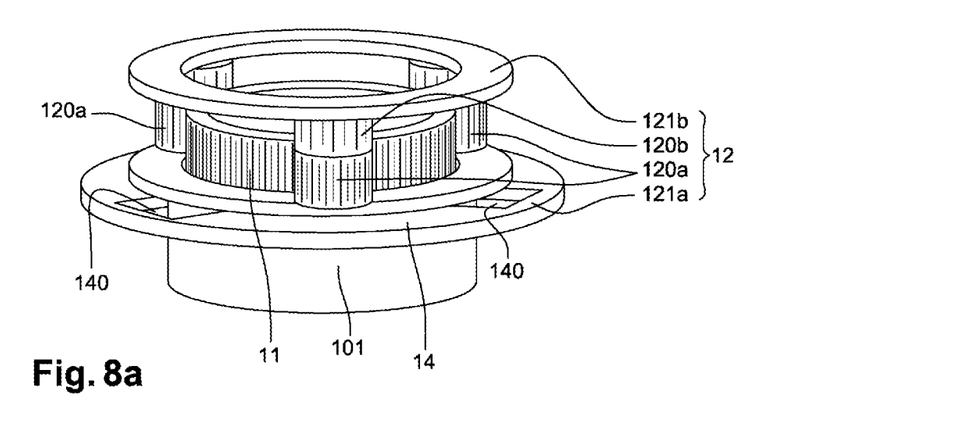
FIG. 8a shows a perspective view of the satellite ring gear of the electric actuator of FIGS. 1 to 4, assembled with the rotor-drive wheel-electronic board assembly, according to a non-limiting embodiment.
Figure 8B:
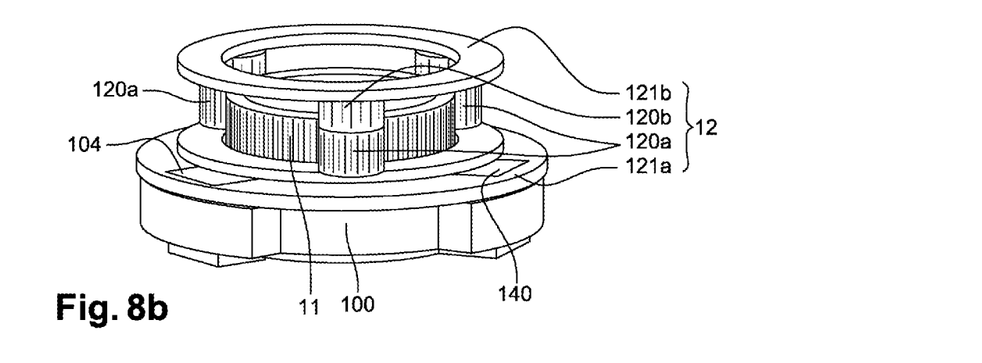
FIG. 8b shows a perspective view of the rotor-drive wheel-electronic board assembly of FIG. 8a assembled with the stator of the electric motor of FIG. 5, according to a non-limiting embodiment.

As illustrated in FIG. 8a, the support 121 is formed by two support rings 121a, 121b suitable for retaining the mechanical axes (not illustrated) on which the satellites 120 rotate. The satellites 120 are thus disposed between the two support rings 121*a* and 121*b*.

The satellite ring gear 12 rotates about the motor axis 102. In particular, it is the support 121 thereof that rotates about said motor axis 102 so as to rotate the satellites 120 about said motor axis 102.

Output Wheel 13

The output wheel 13 is illustrated in FIGS. 1 to 4, 9*a*, 9*b* and 10*b*.

The output wheel 13 is suitable for:
  being rotated by the satellite ring gear 12, as previously seen;
  driving the movable element 20 of the HVAC system.

In particular, the output wheel 13 comprises:
  an external planet gear 131; and
  an output star wheel 130.

The external planet gear 131 is suitable for being rotated by the satellite ring gear 12. In particular, the external planet gear 131 is suitable for engaging with the upper gear stage 120*b* of the satellites 120 of the satellite ring gear 12, as previously described. The external planet gear 131 comprises a toothed internal surface 1301 (illustrated in FIG. 9*b*), the teeth of which engage with the teeth of the satellites 120 of the satellite ring gear 12.

The output star wheel 130 is suitable for driving the movable element 20, so that said element moves. Therefore, the movable element 20 has the same speed of rotation as the output star wheel 130.

In particular, the output star wheel 130 is suitable for engaging with a projecting part 200 (schematically illustrated in FIG. 1) of the movable element 20.

The shape of the output star wheel 130 thus matches the projecting part 200 of the movable element 20.

Figure 4:
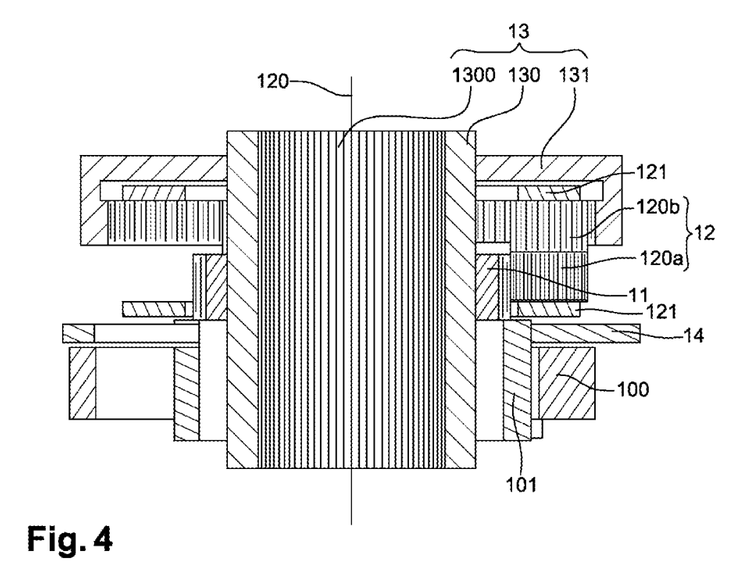
FIG. 4 is a section view of the electric actuator of FIG. 3, according to a non-limiting embodiment.

In a non-limiting embodiment, the output star wheel 130 is hollow and has splines on its internal surface, as illustrated in FIG. 4, for example. The output wheel 13 is thus, in this non-limiting embodiment, an output wheel called female wheel.

The height of the output star wheel 130 is sufficient to push in the projecting part 200 of the movable element 20.

Figure 9A:
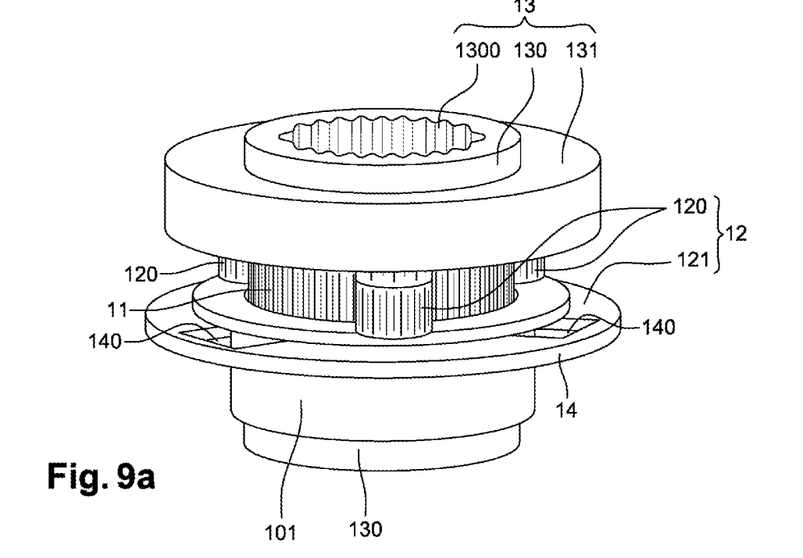
FIG. 9a shows a perspective view of the output wheel of the electric actuator of FIGS. 1 to 4, assembled with the rotor-drive wheel-electronic board-satellite ring gear assembly, according to a non-limiting embodiment.
Figure 9B:
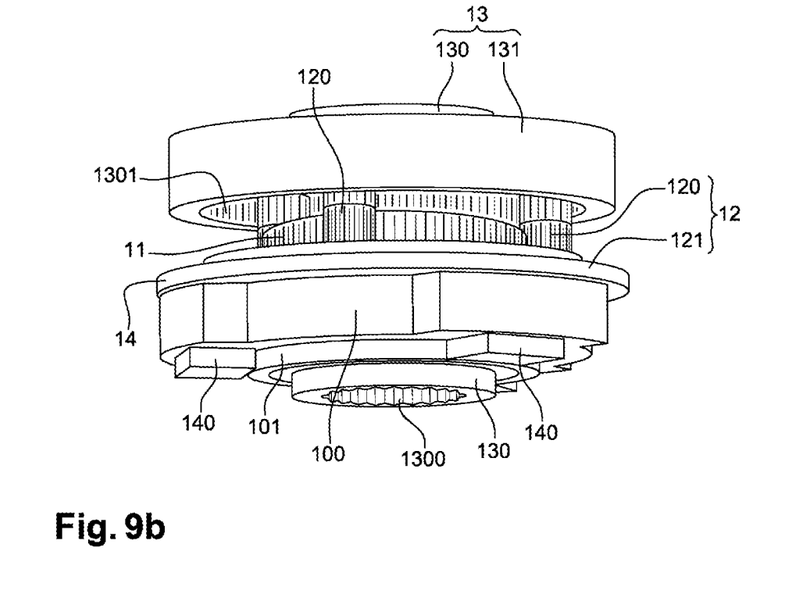
FIG. 9b shows a perspective view of the rotor-drive wheel-electronic board-satellite ring gear-output wheel assembly of FIG. 9a assembled with the stator of the electric motor of FIG. 5, according to a non-limiting embodiment.

As illustrated in FIG. 9*a*, the output star wheel 130 is partially axially projecting from the external planet gear 131, so as to be inserted into the upper cap 15*a* of the housing 15, as illustrated in FIG. 10*b*. Whilst the other elements 10, 11, 12, 14 of the electric actuator 1 are contained in the housing 15 without being accessible, the output star wheel 130 is thus accessible in order to insert the projecting part 200 of the movable element 20 therein.

As illustrated in FIG. 4, the output star wheel 130 extends along the motor axis 102 toward the stator 101.

In a non-limiting embodiment, the output star wheel 13 fully or partly passes through the electric actuator 1.

This allows the projecting part 200 of the movable element 20 to be inserted on one side or the other of the actuator 1. This thus provides greater flexibility when installing the actuator 1 in the HVAC system. Finally, this allows an electric actuator to be provided that is axially more compact relative to an output star wheel that is a non-through wheel and mainly extends as a projection from the housing 15.

In a non-limiting embodiment, the output star wheel 13 fully or partly passes through the electric motor 10. In particular, it thus fully or partly passes through the opening 103 of the previously described rotor 100.

In a non-limiting alternative embodiment illustrated in FIGS. 1 and 4, the output star wheel 130 fully passes through the electric motor 10, until it emerges on the stator side 100 of the actuator 1. It thus passes all the way through the electric actuator 1. This allows a greater connection surface to be provided between the splines of the output star wheel 130 and the projecting part 200 of the movable element 20 and thus makes mounting the movable element 20 on the electric actuator 1 more robust and more reliable.

The output star wheel 130 and the external planet gear 131 are rigidly connected. Consequently, the rotation of the external planet gear 131 causes the rotation of the output star wheel 131. In non-limiting embodiments, the output star wheel 130 is overmolded with the external planet gear 131 or is nested within said external planet gear 131.

The drive wheel 11, the satellite ring gear 12, and said output wheel 13 that are described are thus stacked and nested. They form a planetary gear train, also called planetary reduction gear.

It is to be noted that when a satellite 120 of the satellite ring gear 12 comprises two gear stages 120*a*, 120*b*, reference is made to a dual stage planetary gear train.

A planetary gear train allows sufficient torque to be provided in a much reduced space. This also allows a retention torque to be provided that is sufficient for providing non-reversibility of the electric actuator 1 when it is not powered. Thus, in a non-limiting example, the retention torque is less than 100 N/cm (Newton-centimeters). In other words, the torque to be applied to rotate the electric actuator 1, when it is not powered, is greater than or equal to 100 N/cm. Thus, the electric actuator 1 is non-reversible (it cannot rotate) when there are forces below 100 N/cm.

A planetary gear train thus allows a sufficient retention torque to be provided for preventing the movable element 20 from moving during vibrations, which can occur when the motor vehicle is moving, for example, when it passes over a speed bump. Thus, any noise originating from the movable element 20 is suppressed.

Furthermore, having a retention torque that is sufficient for preventing the movable element 20 from moving allows the power supply of the electric actuator 1 to be cut off after a thermal adjustment (adjustment of the heating, the air conditioning and/or the ventilation) has been implemented in order to place the movable element 20 in a determined position. Said electric actuator 1 does not need to be operated for the movable element 20 to remain in the determined position. This allows less energy to be consumed.

Electronic Board 14

The electronic board 14 is illustrated in FIGS. 1 to 4 and 7*a* to 9*b*.

In a non-limiting embodiment, the electronic board 14 is flat and extends in a plane perpendicular to the motor axis 102. The extension plane thus intersects the motor axis 102.

In a non-limiting embodiment, the electronic board 14 is positioned on or below said electric motor 10.

Figure 7A:
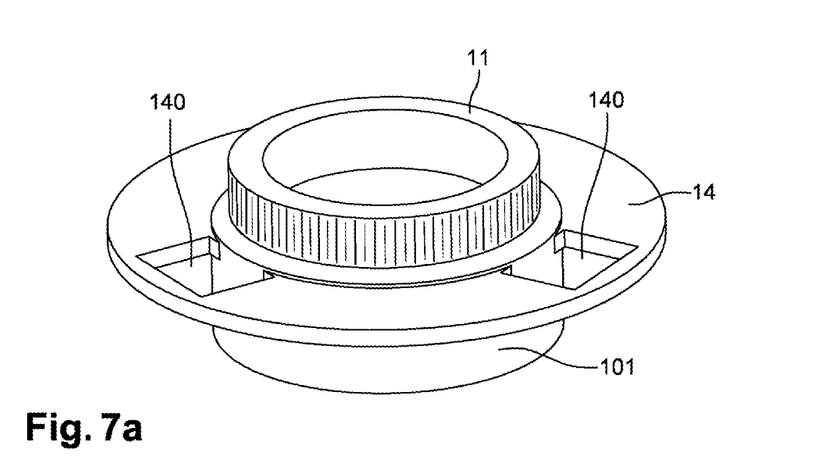
FIG. 7a shows a perspective view of the electronic board of the electric actuator of FIGS. 1 to 4, assembled with the rotor-drive wheel assembly of FIG. 6a, according to a non-limiting embodiment.
Figure 7B:
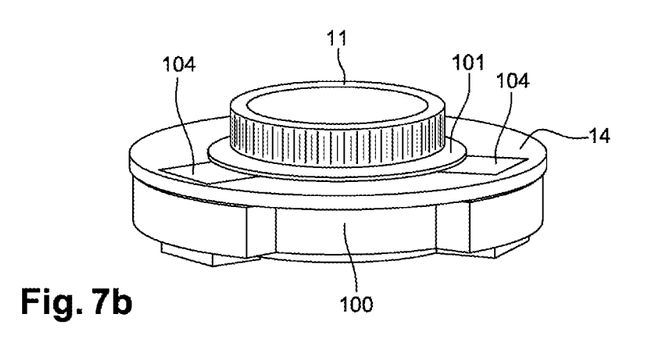
FIG. 7b shows a perspective view of the rotor-drive wheel-electronic board assembly of FIG. 7a assembled with the stator of the electric motor of FIG. 5, according to a non-limiting embodiment.

In a non-limiting alternative embodiment, illustrated in FIG. 7*b*, it is positioned on the stator 100 of the electric motor 10. In a non-limiting embodiment, it is suitable for surrounding all or part of the rotor 101. It is thus a disk that is fully or partly bored.

The electronic board 14 is simple and quick to assemble, since it simply needs to be placed on the stator 100. The assembly of the electronic board 14 thus can be automated. In an illustrated non-limiting alternative embodiment, the electronic board 14 is substantially circular shaped and has an opening, into which said rotor 101 can be inserted. Thus, it is a fully bored disk that is centered on the axis of the motor 102. Thus, the electronic board 14 simply needs to be fitted on the rotor 101.

In an illustrated non-limiting embodiment, the electronic board 14 comprises windows 140 adapted for allowing through the coils 104 of the stator 100. Thus, the coils 104 are used as a poka-yoke for positioning the electronic board 14 on the stator 100. During assembly, the coils 104 are forcibly inserted in the windows 140.

The electronic board 14 comprises an electrically insulating substrate supporting a plurality of conductive tracks and a plurality of electronic components (not illustrated). In a non-limiting embodiment, it also comprises a control device, called "driver", for the electric motor 10 suitable for receiving the control signals and the power signals for the electric motor 10 that originate from the electric plug 152.

Furthermore, the electronic board 14 is connected to the coils 104 of the stator 101 and thus allows them to be electrically powered.

The electronic board 14 is, in a non-limiting example, a printed circuit board, called PCBA ("Printed Circuit Board Assembly").

The configuration of the described electronic board 14 on or below the electric motor 10 allows an electronic board 14 to be provided that is big enough for positioning the active components (capacitor, transistors, inductors, etc.) far enough apart from each other to ensure good electromagnetic compatibility.

As can be seen, FIGS. 6b, 7b, 8b, 9b and 10b illustrate steps of a method for assembling the elements of the electric actuator 1, in a non-limiting embodiment.

In this non-limiting embodiment:
the drive wheel 11 is overmolded with the rotor 101;
the electronic board is disk shaped and has an orifice, through which the rotor 101 and the drive wheel 11 can pass.

Therefore, the steps are as follows:
nesting the rotor 101-drive wheel 11 assembly within the stator 100 (FIG. 6b);
positioning the electronic board 14 on the stator 101 (FIG. 7b);
nesting the satellite ring gear 12 within the drive wheel 11 so as to surround said drive wheel 11 and positioning said satellite ring gear 12 on the electronic board 14 (FIG. 8b);
inserting the output star wheel 130 into the rotor 101 of the electric motor so as to nest the output wheel 13 within the satellite ring gear 12 and within the drive wheel 11 (FIG. 9b);
positioning the assembly 10-11-12-13-14 in the lower cap 15b of the housing 15;
placing the upper cap 15a on the lower cap 15b in order to close the housing 15.

Thus, the electric motor 10, the drive wheel 11, the electronic board 14, the satellite ring gear 12, and the output wheel 13 are stacked in this order along the motor axis 102.

Of course, the description of the invention is not limited to the application and to the embodiments described above. Thus, in addition to use in an HVAC system, the electric actuator 1 also can be used to drive a movable element 20, such as a flap located on the front face of the motor vehicle for regulating the intake air in the engine compartment and for improving the aerodynamic penetration of the motor vehicle.

Thus, the electric actuator 1 can be used in any system that requires the rotation of a movable element.

Thus, in another non-limiting embodiment, the housing 15 is made of a metal material.

Thus, in another non-limiting embodiment, the shape of the housing 15 can differ from the circular shape so that its mounting device 151 can be adapted to attachment points on existing HVAC systems and thus is able to replace existing electric actuators with the actuator that is the subject matter of the invention.

Thus, in another non-limiting embodiment, the electronic board 14 is semi-circular shaped and has a semi-circular opening.

Thus, in another non-limiting embodiment, the electronic board is a flexible board called "flexboard".

Thus, in another non-limiting embodiment, the electronic board 14 is also suitable for sending diagnostic signals from the electric actuator 1 to a multiplex network of the CAN or LIN type via the electric connector (not illustrated), which engages with the electric plug 152.

Thus, in another non-limiting embodiment, the movable element 20 is a kinematic part connected to a plurality of air flaps. The output star wheel 130 of the output wheel 13 is thus suitable for engaging with said kinematic part. The electric actuator 1 is thus adapted for electrically controlling a plurality of air flaps.

Thus, in another non-limiting embodiment, the satellite ring gear 12 comprises a single stage or more than two stages of satellites 120. It will be noted that the more the number of stages increases, the more the gear reduction ratio of the gear train increases, and the more the output torque increases.

Thus, the described invention in particular has the following advantages:
it allows a more radially and axially compact electric actuator 1 to be provided. The height and the width are reduced;
it provides the possibility of avoiding having an intermediate kinematic part between the movable element 20 and the electric actuator 1. Thus, no noise is generated by an intermediate moving part. Removing the intermediate part reduces the overall weight of the HVAC system and the number of parts for moving the movable element 20. Thus, this advantage is particularly advantageous due to the tendency of manufacturers to increase the number of movable elements 20 in motor vehicles in order to increase the areas of thermal comfort for the users of the motor vehicles. Furthermore, there is less wear on the HVAC-movable element chain, which allows the HVAC system to have better reliability and higher strength;
it avoids having to use endless screws for actuating the gear train and providing a sufficient retention torque, which avoids having to lay down the electric motor in the HVAC system. Indeed, the use of an endless screw involves laying the electric motor so that the motor axis is perpendicular to the axis of the output star wheel. This leads to an increase in the height of such an electric actuator with a horizontal electric motor, since said electric motor has a diameter that is greater than the height of the electric actuator;
it allows efficiency to increase and the noise originating from the movable element 20 to be reduced by virtue of the planetary gear train;
by virtue of the single housing 15 of the electric actuator 1, it avoids having to have two separate housings, including a casing for the electric motor 10 and including another housing for the gear train formed by the drive wheel 11, the satellite ring gear 12, and the output wheel 13;
it enables a drive shaft to no longer be used and avoids the associated disadvantages.

The invention claimed is:

1. An electric actuator for driving a movable element for a heating, ventilation and/or air conditioning system for a motor vehicle, comprising:
an electric motor comprising a stator and a rotor;
a satellite ring gear comprising at least one satellite;
an output wheel for being rotated by the satellite ring gear; and
a drive wheel, directly connected to the rotor for being rotated by the rotor and for rotating the satellite ring gear;
wherein the output wheel comprises an output star wheel for driving the movable element of the ventilation, heating and/or air conditioning system,
wherein the rotor of the electric motor and the drive wheel each comprise a hollow, and
wherein the output star wheel is configured to pass through the hollow of the rotor and the hollow of the drive wheel such that the output star wheel fully passes through the electric motor.

2. The electric actuator as claimed in claim 1, wherein the drive wheel is overmolded with the rotor of the electric motor.

3. The electric actuator as claimed in claim 1, wherein the electric motor, the drive wheel, the satellite ring gear, and the output wheel extend along the same motor axis of the electric motor.

4. The electric actuator as claimed in claim 1, further comprising a housing, and wherein the electric motor, the drive wheel, the satellite ring gear, and the output wheel are housed in the housing.

5. The electric actuator as claimed in claim 1, wherein the at least one satellite comprises two gear stages with different diameters.

6. The electric actuator as claimed in claim 1, wherein the satellite ring gear comprises an odd number of satellites.

7. The electric actuator as claimed in claim 1, wherein the drive wheel, the satellite ring gear, and the output wheel form a planetary gear train.

8. The electric actuator as claimed in claim 1, further comprising: an electronic board positioned on or below the electric motor.

9. An electric actuator for driving a movable element for a heating, ventilation and/or air conditioning system of a motor vehicle, the electric actuator comprising:
an electric motor comprising a stator and a rotor;
a satellite ring gear comprising at least one satellite;
an output wheel for being rotated by the satellite ring gear; and
a drive wheel, directly connected to the rotor for being rotated by the rotor and for rotating the satellite ring gear,
wherein the output wheel comprises an output star wheel for driving the movable element of the ventilation, heating and/or air conditioning system, the drive wheel being directly connected to the at least one satellite of the satellite ring gear,
wherein the drive wheel comprises teeth, which engage with teeth of the at least one satellite of the satellite ring gear, allowing the satellite ring gear to be directly driven by the drive wheel,
wherein the rotor of the electric motor and the drive wheel each comprise a hollow, and
wherein the output star wheel is configured to pass through the hollow of the rotor and the hollow of the drive wheel such that the output star wheel fully passes through the electric motor.

* * * * *